E. G. HAKEMAN.
AUTOMOBILE NON-SKID DEVICE.
APPLICATION FILED NOV. 24, 1917.
1,275,554. Patented Aug. 13, 1918.
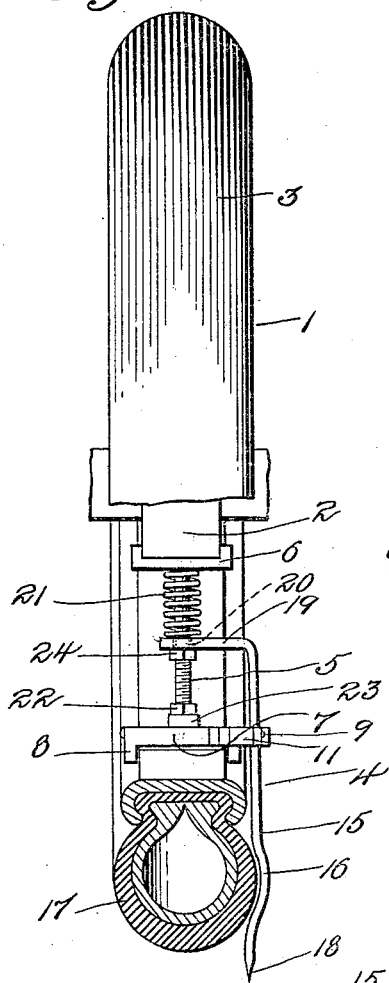
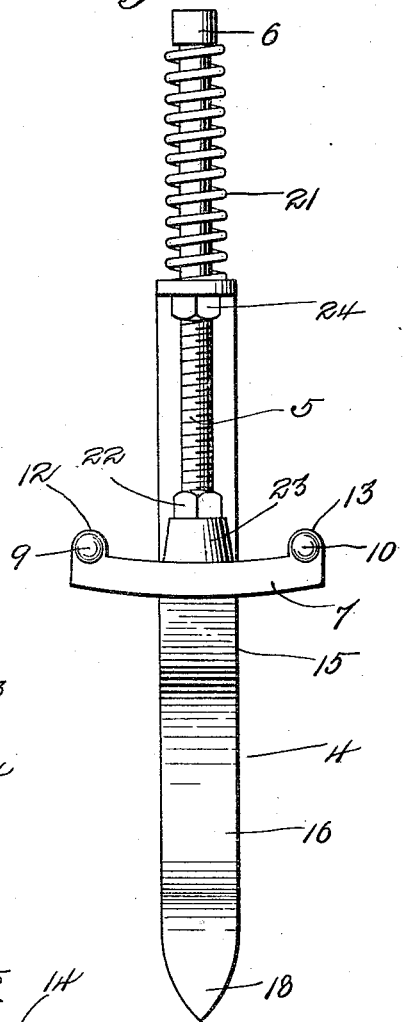
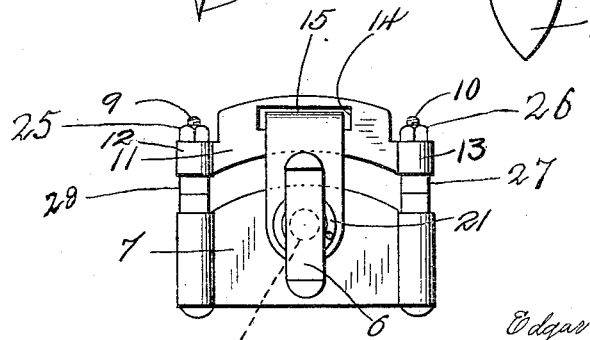
Inventor
Edgar G. Hakeman
By
Attorney

UNITED STATES PATENT OFFICE.

EDGAR G. HAKEMAN, OF HARTWICK, IOWA.

AUTOMOBILE NON-SKID DEVICE.

1,275,554.  Specification of Letters Patent.  Patented Aug. 13, 1918.

Application filed November 24, 1917. Serial No. 203,791.

*To all whom it may concern:*

Be it known that I, EDGAR G. HAKEMAN, a citizen of the United States, residing at Hartwick, in the county of Poweshiek and State of Iowa, have invented certain new and useful Improvements in Automobile Non-Skid Devices, of which the following is a specification.

This invention relates to improvements in automobile appliances and has for its object to provide means whereby an automobile wheel may be prevented from skidding in rotating upon the ground.

Another object of the invention is to provide an attachment for automobile wheels having a rigidly held member projecting below the tread of the tire.

A still further object of the invention is to provide a non-skid device adjustable to automobile wheels of various sizes.

With the above and other objects in view, I have invented the device illustrated in the above drawings in which—

Figure 1 is an elevational view of the automobile wheel having my invention attached thereto.

Fig. 2 is an elevational view of my invention taken from another side.

Fig. 3 is a top plan view of the device.

Like reference characters indicate like parts throughout the following specification and in the views and drawings in which 1 is an automobile wheel having a hub 2 and a rim 3. Secured to the wheel is a non-skid device 4 consisting of a rod 5 having yoke 6 adapted to fit around the hub 2. Secured to the other end of the rod is a rim engaging plate 7 having a flange 8 adapted to engage one side of the rim. Adjustably secured to one edge of the plate 7 by means of the bolts 9 and 10, is a bracket 11 having bosses 12 and 13 at the opposing ends thereof which are adapted to co-act with the flange 8 to hold the plate 7 centered upon said rim 3. The end surface of the plate 7 is slightly convex to conform to the concavity of the inner surface of the rim 3. Bracket 11 is provided with a slot 14 through which the ground engaging spike 15 is adjustably slidable. The lower end of said member 15 having a bent out portion 16 to extend around the tire 17 of the wheel the extreme lower end 18 of said spike being sharpened in order that it may readily penetrate into the ground in order to prevent the wheel from skidding while tractionally operating thereon. The upper end 19, of said spike which is preferably flat, is bent at right angles and provided with an opening 20 through which the rod 5 is movable. Seated between the yoke 6 and the upper end 19 of the spike 15 and mounted upon the rod 5 is a coil spring 21 the tension of which is sufficient to force the spike into the ground. The slot 14 prevents the spike from moving laterally. The tension of the spring and the position of the spike relative to the rod may be adjusted by means of the nut 24 threaded on the central part of the rod 5. The lower end of said rod 5 is also threaded into the boss 23 on the upper surface of the plate 7 and a lock nut 22 is provided to hold the members 5 and 7 in relative positions. The width of the rim engaging portion of the device may be regulated by means of the nuts 25 and 26, washers 27 and 28 being used as fillers between the plate 7 and bracket 11.

Having now described my invention, that which I claim to be new and desire to procure by Letters Patent is:

1. An automobile non-skid device comprising a rim engaging clamp, a hub engaging clamp, means provided upon said clamps for fitting over the edges of the hub and rim of a wheel for holding the clamps against lateral shifting movement upon said wheel, an adjusting bolt interposed between said clamps, means for locking said bolt in an adjusted position for holding said clamps in firm engagement with the hub and rim of a wheel, guiding means formed in one of said clamps, a spike slidably mounted through said guiding means and provided with a laterally extending inner end, means adjustably secured to said bolt for limiting the outward movement of said spike thereon, and yieldable means for engaging the laterally extending end of said spike and yieldably holding the same in an extended position.

2. An automobile non-skid device comprising an inner clamp, an outer clamp, each of said clamps provided with laterally projecting retaining lugs, said lugs adapted to hold said clamps upon a support against shifting movement, a spacing bolt interposed between said clamps, one of said clamps provided with a lug formed upon the inner face thereof for receiving the threaded end of said spacing bolt, a nut adjustably mounted upon the lower end of said spacing bolt and adapted to firmly lock said spacing bolt in a set position, a second nut adjustably mounted upon said bolt, one of said clamps provided with a spike engaging means formed therein, a spike extending therethrough and provided with a laterally extending end, said laterally extending end provided with an aperture formed therein through which said bolt extends, and a coil spring interposed between the inner clamp and said laterally extending end for normally and yieldably forcing said spike in an outwardly extended position.

3. An automobile non-skid device comprising an inner clamp adapted to engage the hub of a wheel, an outer clamp adapted to engage the rim of a wheel, each of said clamps provided with laterally extending lugs adapted to fit upon opposite sides of respective hub and rim above mentioned for resisting lateral shifting movement of said clamps relative to said wheel, a spacing bolt interposed between said inner and outer clamps, said outer clamp provided with a lug formed upon the inner face thereof, said bolt provided with a threaded end fitting in said lug, means for locking said bolt within said lug, a spike carried by said outer clamp and movable therethrough, said spike provided with a laterally extending end having an enlarged aperture formed at the inner extremity thereof, said bolt extending through said enlarged aperture, an adjusting nut threaded upon said bolt and engaging the under face of said laterally extending end for limiting the outward movement of said spike relative to said bolt, and a coil spring interposed between said inner clamp and said laterally extending end of said spike for yieldably and normally forcing said spike in an outwardly extended position.

4. A non-skid device of the class described comprising an inner clamp, an outer clamp, means for facilitating the holding of said clamps upon the hub and rim of a wheel, the spacing bolt interposed between said clamps and adapted to firmly hold said clamp in engagement with a support, means formed upon said bolt for locking said bolt against turning movement, said outer clamp provided with an adjustable section spaced from the main body portion thereof, said adjustable section provided with a guiding aperture formed therein, a spike slidably mounted through said guiding aperture and provided with a laterally extending end, said bolt extending through said laterally extending end of said spike, and a spring interposed between said inner clamp and said laterally extending end for yieldably forcing said spike in an outwardly extended position.

5. A non-skid device of the class described comprising a plurality of clamps adapted to engage the rim and hub of a wheel, spacing means interposed between said clamps, one of said clamps provided with a body portion, an adjustable portion secured to said body portion, bolts passing through said adjustable portion and engaging said body portion, spacing washers mounted upon said bolts and interposed between said body portion and adjustable portion for adjustably spacing said adjustable portion relative to said body portion, a gripping spike, said adjustable portion provided with a guiding aperture therein, said spike extending through said guiding aperture, and yieldable means engaging said spike for yieldably forcing the same in an outwardly extended position.

6. A non-skid device of the class described comprising a clamp, said clamp comprising an inner section, an adjustable section adjustably secured thereto, said adjustable section provided with an enlarged aperture formed therein, a spike slidably mounted through said aperture and provided with a laterally extending end formed upon the inner portion thereof, a securing bolt carried by said clamp, an inner clamp carried by one end of said securing bolt, the lower end of said spike being shaped to conform to the contour of a tire, and a spring carried by said bolt and yieldably engaging the inner end of said spike for yieldably and normally urging said spike in an outwardly extended position.

In testimony whereof I affix my signature in the presence of two witnesses.

EDGAR G. HAKEMAN.

Witnesses:
C. G. KORNS,
M. A. OSTROM.

Copies of this patent may be obtained for five cents each, by addressing the "Commissioner of Patents, Washington, D. C."